United States Patent
Sinha et al.

(10) Patent No.: US 11,468,494 B2
(45) Date of Patent: Oct. 11, 2022

(54) SYSTEM, NON-TRANSITORY COMPUTER READABLE MEDIUM, AND METHOD FOR PERSONALIZED COMPLEMENTARY RECOMMENDATIONS

(71) Applicant: Walmart Apollo, LLC, Bentonville, AR (US)

(72) Inventors: Nimesh Sinha, San Jose, CA (US); Luyi Ma, Sunnyvale, CA (US); Hyun Duk Cho, San Francisco, CA (US); Sushant Kumar, Sunnyvale, CA (US); Kannan Achan, Saratoga, CA (US); Rahul Ramkumar, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 27 days.

(21) Appl. No.: 17/096,666

(22) Filed: Nov. 12, 2020

(65) Prior Publication Data
US 2022/0148062 A1    May 12, 2022

(51) Int. Cl.
*G06Q 30/00*    (2012.01)
*G06Q 30/06*    (2012.01)
*G06F 17/18*    (2006.01)

(52) U.S. Cl.
CPC ......... *G06Q 30/0631* (2013.01); *G06F 17/18* (2013.01); *G06Q 30/0629* (2013.01)

(58) Field of Classification Search
CPC .................. G06Q 30/0601–0645; G06F 17/18
USPC ................................................. 705/26.1–27.2
See application file for complete search history.

(56) References Cited

U.S. PATENT DOCUMENTS

| | | | |
|---|---|---|---|
| 7,113,917 B2 | 9/2006 | Jacobi et al. | |
| 7,437,344 B2 | 10/2008 | Peyrelevade | |
| 7,720,720 B1 | 5/2010 | Sharma et al. | |
| 8,015,140 B2 | 9/2011 | Kumar et al. | |
| 10,192,253 B2 | 1/2019 | Huet et al. | |
| 10,445,742 B2 | 10/2019 | Prendki | |
| 10,867,340 B1 * | 12/2020 | Gauvin | G06N 5/04 |
| 10,991,028 B1 * | 4/2021 | Aubrey | G06Q 30/0631 |

(Continued)

OTHER PUBLICATIONS

Kim, Kwanho, Yerim Choi, and Jonghun Park. "A Conditional Feature Utilization Approach to Itemset Retrieval in Online Shopping Services." Journal of Electronic Commerce Research 15.4 (2014): 317-38. ProQuest. Web. Feb. 2, 2022. (Year: 2014).*

(Continued)

*Primary Examiner* — Jeffrey A. Smith
*Assistant Examiner* — Kennedy Gibson-Wynn
(74) *Attorney, Agent, or Firm* — Duane Morris LLP; Manila Rawat

(57) ABSTRACT

Systems and methods for generating a set of personalized complementary recommendations is disclosed. A user identifier and an anchor item identifier are received. A set of personalized-weighted items and a set of complimentary-weighted items are each generated based on the user identifier and the anchor item identifier. The personalized-weighted items are generated by a trained supervised model. The complementary-weighted items are generated by a trained unsupervised model. A set of personalized complementary recommendations including a subset of the personalized-weighted items and a subset of the complementary-weighted items is generated.

17 Claims, 8 Drawing Sheets

(56) References Cited

U.S. PATENT DOCUMENTS

2016/0328787 A1* 11/2016 Szulczewski ...... G06Q 30/0643
2017/0287044 A1   10/2017 Rose et al.
2019/0073708 A1*  3/2019 Mitra ................. G06Q 30/0631
2019/0370879 A1  12/2019 Bhattacharjee
2021/0142385 A1*  5/2021 Alahmady ............ G06N 20/00

OTHER PUBLICATIONS

Silva, Xavier dos Santos. "Recommender Systems for Grocery Retail—A Machine Learning Approach." Order No. 28992768 Instituto Politecnico do Porto (Portugal), 2020. Ann Arbor: ProQuest. Web. Jul. 19, 2022. (Year: 2020).*

Balazs Hidasi et al., "Fast ALS-Based Tensor Factorization for Context-Aware Recommendation from Implicit Feedback," 2012, pp. 67-82.

Romain Warlop, "Novel Learning and Exploration-Exploitation Methods for Effective Recommender Systems," Universit'e des Sciences et des Technologies de Lille, Oct. 19, 2018, 158 pages.

* cited by examiner

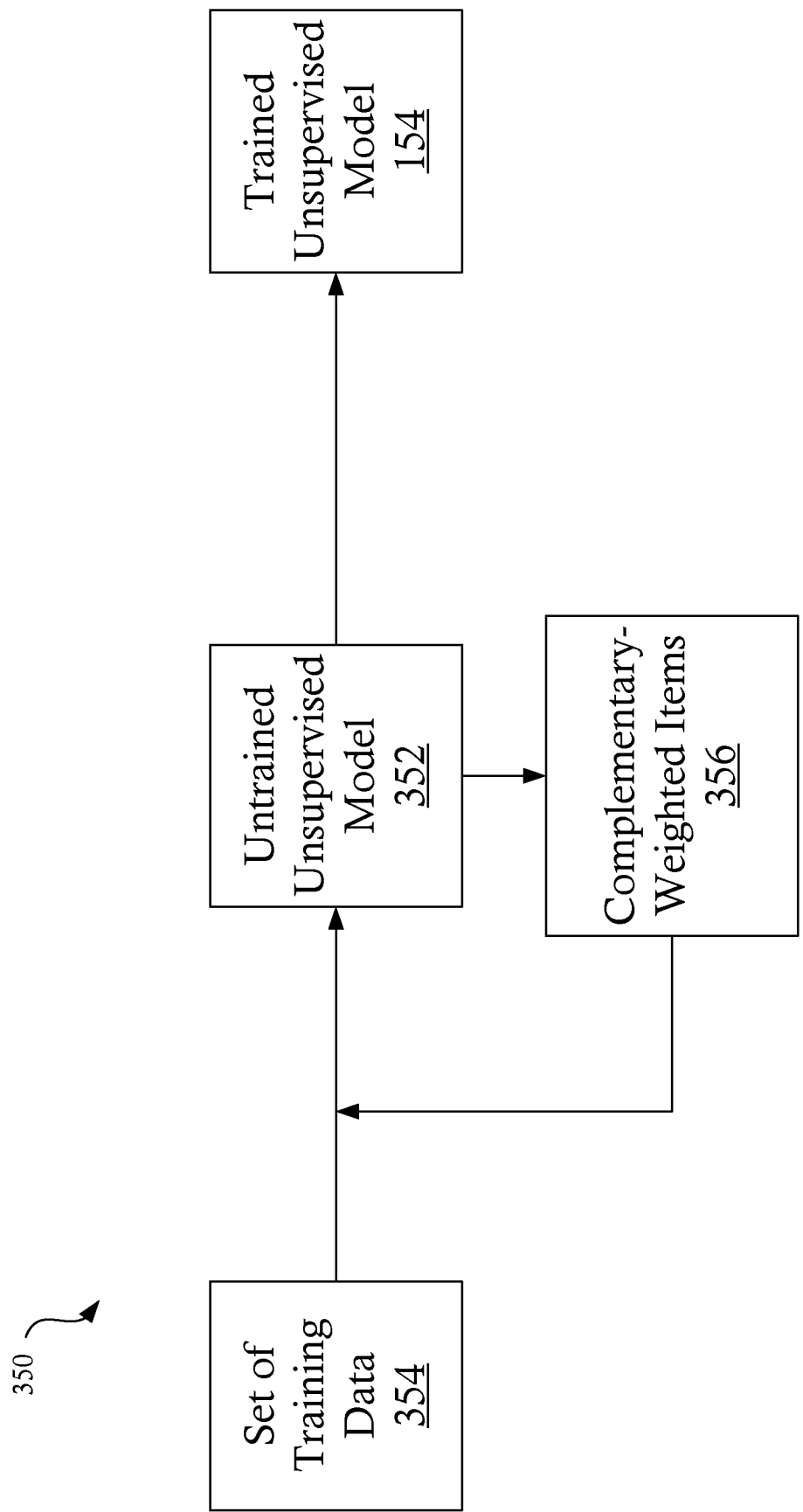

SYSTEM, NON-TRANSITORY COMPUTER READABLE MEDIUM, AND METHOD FOR PERSONALIZED COMPLEMENTARY RECOMMENDATIONS

TECHNICAL FIELD

This application relates generally to personalized content predictions and, more particularly, personalized content predictions using combined models.

BACKGROUND

Various network interfaces, such as e-commerce interfaces, are configured to present one or more interface pages including a plurality of containers (or slots). A plurality of content elements may be available for each container. For example, in e-commerce environments, a carousel module may have multiple options for filling the open spots on the carousel.

Current interface systems are configured to select elements for filling open containers or slots in an interface based on short-term reward mechanisms. For example, in some embodiments, an element having the highest click-through rate may be selected for presentation to a user. Short-term reward mechanisms and systems are prone to randomness and noise, and fail to take into account long-term or changing user preferences.

SUMMARY

In various embodiments, a system is disclosed. The system includes a non-transitory memory having instructions stored thereon and a processor configured to read the instructions to receive a user identifier and an anchor item identifier, generate a set of personalized-weighted items based on the user identifier and the anchor item identifier, generate a set of complementary-weighted items based on the user identifier and the anchor item identifier, and generate a set of personalized complementary recommendations including a subset of the personalized-weighted items and a subset of the complementary-weighted items. The personalized-weighted items are generated by a trained supervised model and the complementary-weighted items are generated by a trained unsupervised model.

In various embodiments, a non-transitory computer readable medium having instructions stored thereon is disclosed. The instructions, when executed by a processor cause a device to perform operations including receiving a user identifier and an anchor item identifier, generating a set of personalized-weighted items based on the user identifier and the anchor item identifier, generating a set of complementary-weighted items based on the user identifier and the anchor item identifier, and generating a set of personalized complementary recommendations including a subset of the personalized-weighted items and a subset of the complementary-weighted items. The personalized-weighted items are generated by a trained supervised model and the complementary-weighted items are generated by a trained unsupervised model.

In various embodiments, a computer-implemented method is disclosed. The computer-implemented method includes the steps of receiving a user identifier and an anchor item identifier, generating a set of personalized-weighted items based on the user identifier and the anchor item identifier, generating a set of complementary-weighted items based on the user identifier and the anchor item identifier, and generating a set of personalized complementary recommendations including a subset of the personalized-weighted items and a subset of the complementary-weighted items. The personalized-weighted items are generated by a trained supervised model and the complementary-weighted items are generated by a trained unsupervised model.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 8 is a process flow illustrating various steps of the method of training an unsupervised learning model illustrated in FIG. 7, in accordance with some embodiments.

DETAILED DESCRIPTION

Figure 1:
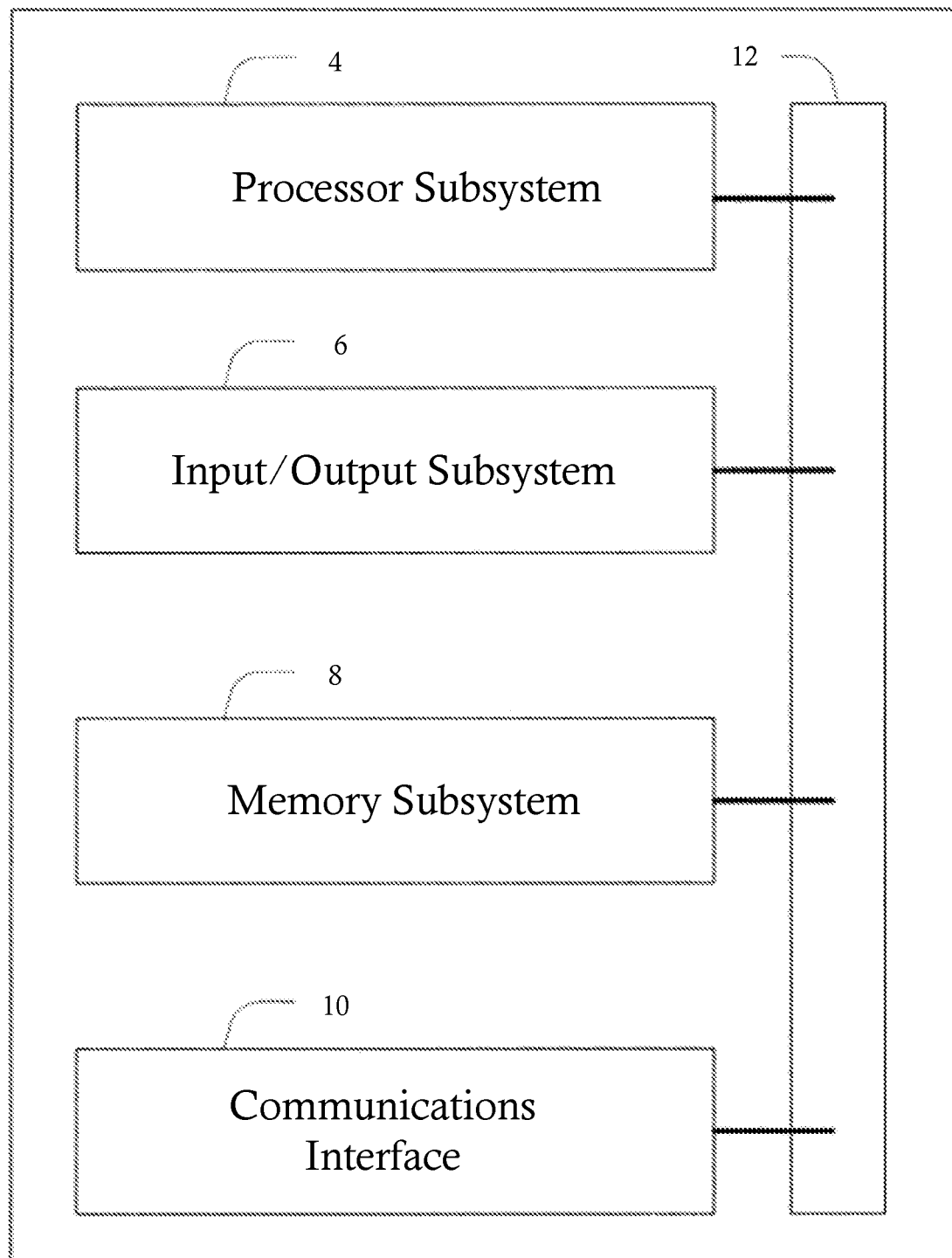
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
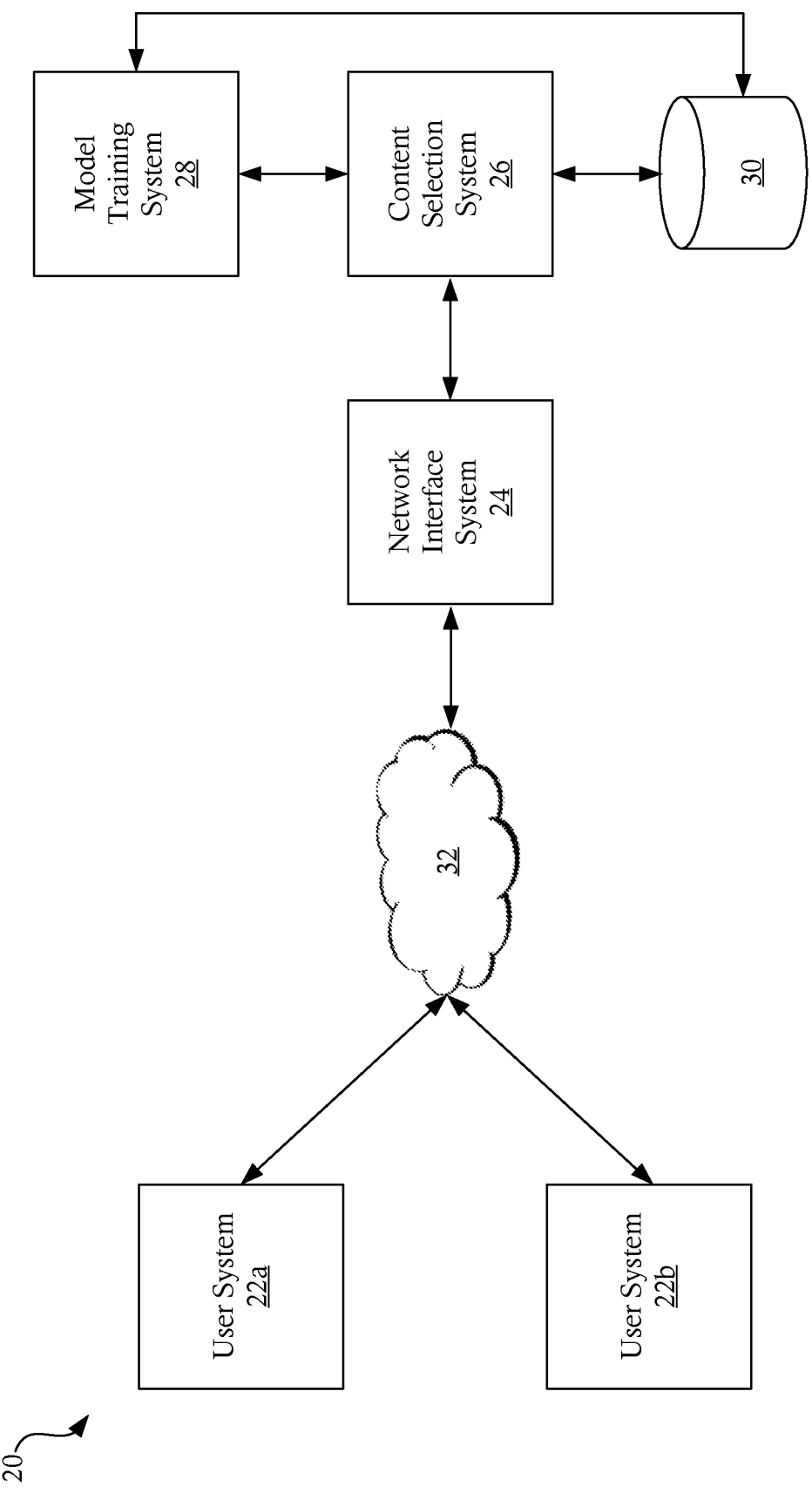
FIG. 2 illustrates a network environment configured to provide an interface including one or more components selected using a personalized complementary recommendation process, in accordance with some embodiments.

FIG. 2 illustrates a network environment 20 configured to provide an interface including one or more components selected using a personalized complementary recommendation process, in accordance with some embodiments. The network environment 20 includes one or more user systems 22a-22b, at least one network interface system 24, at least one content selection system 26, at least one model training system 28, and/or at least one database 30. Each of the systems 22a-28 can include a computer system, such as the computer system 2 described above in conjunction with FIG. 1. It will be appreciated that each of the systems 22a-28 can include generic systems and/or special purpose systems, and are within the scope of this disclosure. Although embodiments are shown with distinct systems, it will be appreciated that any of the illustrated systems may be combined into a single system configured to perform the operations of each of the combined systems. Similarly, it will be appreciated that any of the illustrated systems can be separated into multiple systems configured to perform parallel and/or partial processing of the operations discussed herein.

In some embodiments, each of the systems 22a-28 are configured to exchange data over one or more networks, such as, for example, network 32. In some embodiments, the one or more user devices 22a-22b are configured to communicate with the network interface system 24, which is configured to present one or more interfaces, such as an e-commerce interface. The presented interface includes one or more components, such as, for example, one or more carousels, one or more dynamic components, one or more web components, etc. At least one of the components may be filled by a plurality of content elements. In some embodiments, content elements for at least one of the interface components is selected by the content selection system 26.

In some embodiments, the content selection system 26 is configured to select a content element for filling an open slot using a combined content selection process including a first content selection model and a second content selection model. As discussed in greater detail below, the combined content selection process is configured to balance exploiting content elements having the higher reward (e.g., select from content options having the highest click-rate, purchase rate, etc.), referred to as "exploit" mechanisms, and exploring new content elements to collect information (e.g., selecting new content or content having low information with respect to reward values), referred to as "explore" mechanisms. For example, in some embodiments, a predetermined number of potential content elements may be stored in a database, such as database 30. The content selection system 26 may use a combined content selection process to select a plurality of content elements that are complementary to one or more previously selected items or products and content elements based on user preferences.

As discussed in greater detail below, the combined content selection process utilizes a first trained model, i.e., a supervised model, and a second trained model, i.e., an unsupervised model, to select content elements for filling open content slots. The supervised model is configured to select personalized, complimentary items (e.g., user-preferred co-purchase items) with a greater weighting given to "personalized" (e.g., user-preferred) items (referred to herein as "personalized-weighted items"), and the unsupervised model is configured to select personalized, complementary items with a greater weighting given to "complementary" (e.g., matching) items (referred to herein as "complementary-weighted items"). The combined content selection process is configured to identify a set of content elements by combining a subset of personalized-weighted items and a subset of the complementary-weighted items to generate personalized complementary recommendations for a user.

The combined content selection process is configured to balance explore and exploit trade-offs between user preferences (e.g., personalized-weighted items selected by supervised model) and presentation of complementary items (e.g., complementary-weighted items selected by the unsupervised model). In certain spaces, such as, for example, grocery products, a user (or customer) may exhibit strong repurchase patterns by continuously purchasing the same items in transactions. The presentation of such user-preferred items increases user engagement and satisfaction. However, the presentation of personalized-weighted items (exploit mechanism) must be balanced with presentation of products that may be relevant to a user and which the user has not previously purchased (explore mechanism).

The disclosed systems and methods provide a general solution to balancing the competing explore-exploit interests to provide a user with personalized complementary recommendations based on the combined content selection process. The combined content selection process is configured to provide personalized complementary recommendations to a user. For example, in one example, if a user selects milk, the combined content selection process may present personalized complementary items including personalized-weighted items (e.g., Brand X yogurt, etc.) and complementary-weighted items (e.g., cereal, bread, other types of milk, etc.).

In some embodiments, the model training system 28 is configured to provide at least one supervised model and at least one unsupervised model for use in the content selection process. As discussed in greater detail below, the supervised model may be trained using any suitable supervised training process configured to receive a set of training data including historical add-to-cart sequence data for a plurality of users. Similarly, as discussed in greater detail below, the unsupervised model may be trained by using any suitable unsupervised training process configured to receive a set of training data including a set of labeled complementary items. Although specific embodiments are discussed herein, it will be appreciated that any suitable supervised and/or unsupervised training processes (or combination thereof) may be applied.

Figure 3:
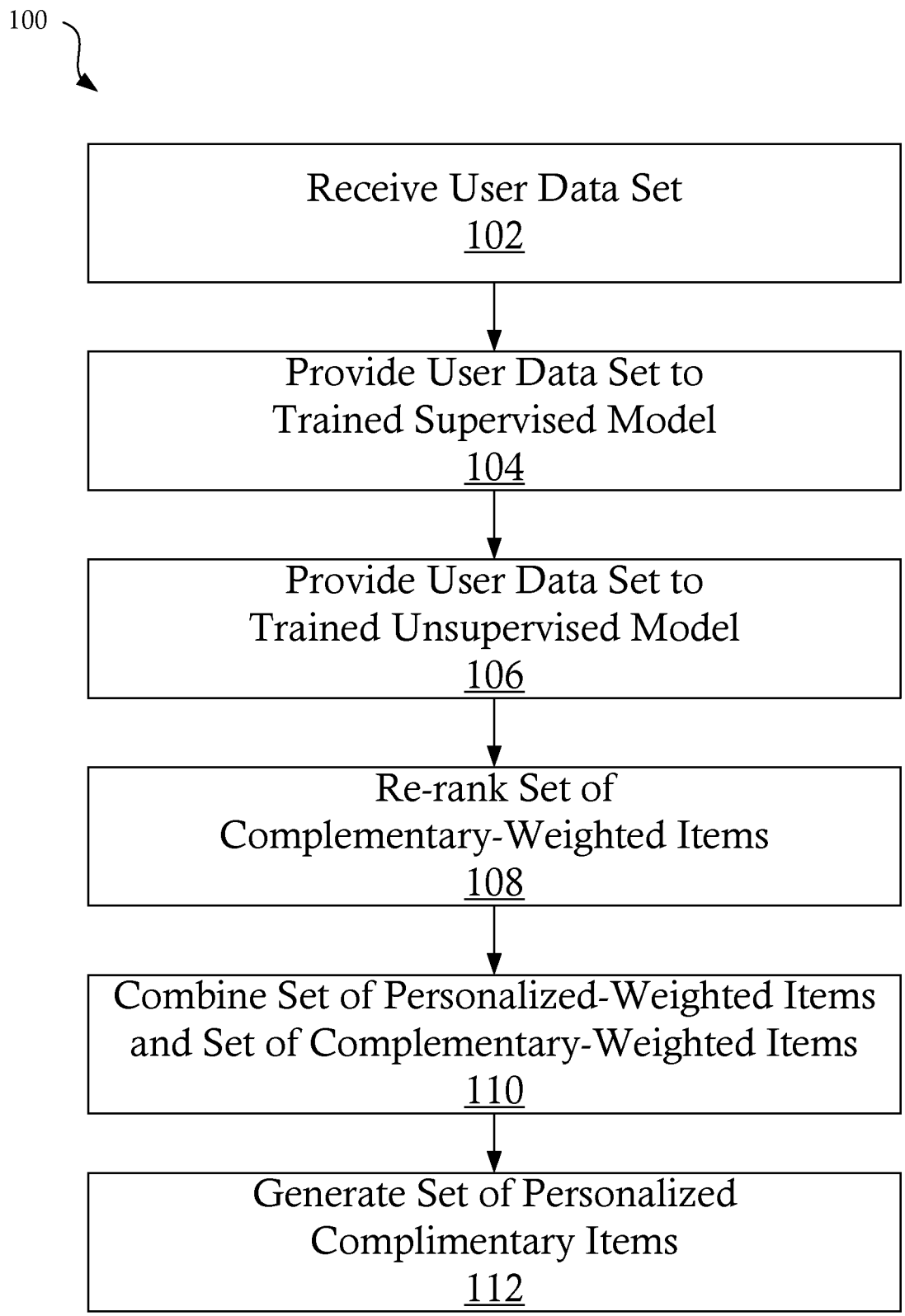
FIG. 3 is a flowchart illustrating a method of generating a set of personalized complementary recommendations using a first trained model and a second trained model, in accordance with some embodiments.
Figure 4:
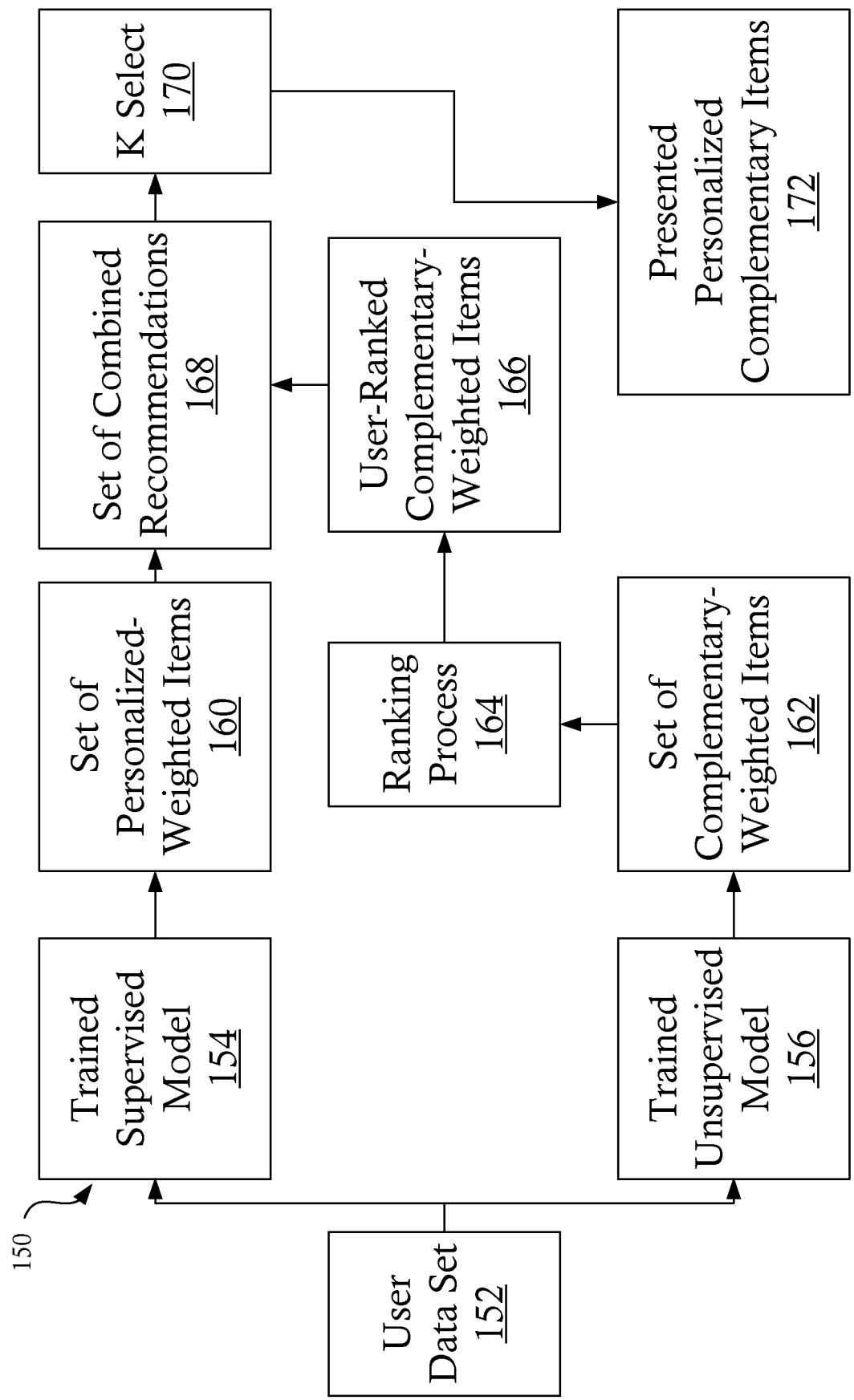
FIG. 4 is a process flow illustrating various steps of the method of generating a set of personalized complementary recommendations illustrated in FIG. 3, in accordance with some embodiments.

FIG. 3 is a flowchart 100 illustrating a method of generating a set of personalized complementary recommendations using a combined content selection process, in accordance with some embodiments. FIG. 4 is a process flow 150 illustrating various steps of the method of generating a set of personalized complementary recommendations illustrated in FIG. 3, in accordance with some embodiments. At step 102, a system configured to generate a set of personalized complementary recommendations, such as complementary recommendation system 26, receives a user data set 152 associated with a user. The user data set 152 may include a user item selection, user purchase history, user preferences, and/or any other suitable user data.

At step 104, the user data set 152 is provided to a supervised model 154 configured to generate a set of personalized-weighted items 160. The supervised model 154 may be configured to utilize features associated with one or more products in a user purchase history to generate the set of personalized-weighted items 160. For example, in some embodiments, the supervised model 154 is configured to generate personalized-weighted items for a user, u, after an item i (e.g., anchor item or user item selection) is added to a user u cart. As discussed in greater detail below, in some embodiments, the supervised model 154 is configured to apply logistic regression.

At step 106, the user data set 152 is provided to an unsupervised model 156 configured to generate a set of complementary-weighted items 162. The unsupervised model 156 may be configured to utilize features associated with products in a set of purchase history including multiple customers to generate the set of complementary-weighted items 162. For example, in some embodiments, unsupervised model 156 is configured to generate complementary-weighted items based on an item i is added to a user cart independent of prior user purchase history. As discussed in greater detail below, in some embodiments, the unsupervised model 156 is configured to apply a Triple2Vec method.

At step 108, the set of complementary-weighted items 162 is re-ranked by a ranking process 164 based on one or more metrics to generate a set of user-ranked complementary-weighted items 166. The ranking process 164 may be based on any suitable metric, such as, for example, a distance between an anchor item i and the recommended item j, the distance between the user u and the item j (i.e., item vector representation), and/or any other suitable metric. Re-ranking of the complementary-weighted items 162 generates a set of user-ranked complementary-weighted items 166 that are configured to reflect a scope of a user, i.e., user preferences with respect to complimentary-weighted items.

In some embodiments, the set of complementary-weighted items 162 is re-ranked based on a score of user preferences in ascending order. For example, in one embodiment, the preference scores (s) for a set of complementary-weighted items $\{j_1, \ldots, j_N\}$ with respect a specific user (u) is represented as:

$$s(u, j_{(1)}) \propto s(u, j_{(n)})$$

which generates a set of ranked complementary-weighted items $\{j_{(1)}, \ldots, j_{(N)}\}$ 166.

At step 110, the set of personalized-weighted items 160 and the set of ranked complementary-weighted items 166 are combined to generate a set of combined recommendations 168. In some embodiments, a subset of the personalized-weighted items 160 (such as the first M personalized-weighted items) and a subset of the ranked complementary-weighted items 166 (such as the first N complementary-weighted items) are selected and combined to generate the set of combined recommendations 168. The combination of personalized-weighted items 160 and ranked complementary-weighted items 166 may be performed by a trained model and/or an automated algorithm configured based on offline evaluation.

At step 112, a k selection process 170 selects a subset of the combined recommendations 168 and outputs a set of presented personalized complementary items 172. For example, in some embodiments, a set of k items is selected from the combined recommendations 168 starting with an item having the highest user ranking, and proceeding sequentially to item $j_{(K)}$, where k≤N, generating a set of personalized complementary items 172 consisting of the first k recommendations adjusted to the user's (u) preference.

In some embodiments, the set of personalized complementary items 172 is selected from the set of combined recommendations 168 based on a weighted selection of items from the set of personalized-weighted items 160 and the set of ranked complementary-weighted items 166. For example, in some embodiments, the number of items in the set of personalized complementary items 172 is fixed. The number of recommendations from the set of personalized-weighted items 160 and the set of ranked complementary-weighted items 166 may be selected based on the equation:

$$k = s + us, s \in [0, k], us \in [0, k]$$

In some embodiments, additional add-to-cart data, such as one-month add-to-cart data, is used as a validation dataset to tune the selection of s and us. In some embodiments, the selection of s and us are optimized based on one or more industry standard metrics such as normalized discounted cumulative gain (NDCG) for k recommendations (NDCG@k), mean reciprocal rank (MRR) for k recommendations (MRR@k), hit-rate for k recommendations (hit-rate@k), mean average precision for k recommendations, and/or any other suitable metrics. In embodiments, for each set s and us, a set of blended k recommendations for a given anchor item i and each metric are evaluated based on the validation dataset. A grid-search of the parameters s and us may be performed to achieve the best parameters to optimize the selected metrics for the recommendation system. The final parameters of s and us are selected based on blended results from the two models based on the selected metrics.

For example, and without limitation, if the anchor item i added to a cart is black tea bags, the method of generating a set of personalized complementary recommendations illustrated in FIG. 3 may generate a first set of personalized complimentary items for a first user $u_1$ including milk or other dairy products and a second set of personalized complimentary items for a second user $u_2$ including other flavors of tea or tea bags. Although both sets of items fall within the set of complementary items for black tea bags, the first user $u_1$ has a "scope" including the dairy products and the second user $u_2$ has a "scope" including other flavors of tea. Although steps 210 and 212 are illustrated as separate steps, it will be appreciated that steps 210 and 212 may be combined into a single step to generate a set of personalized complementary items 172.

Figure 5:
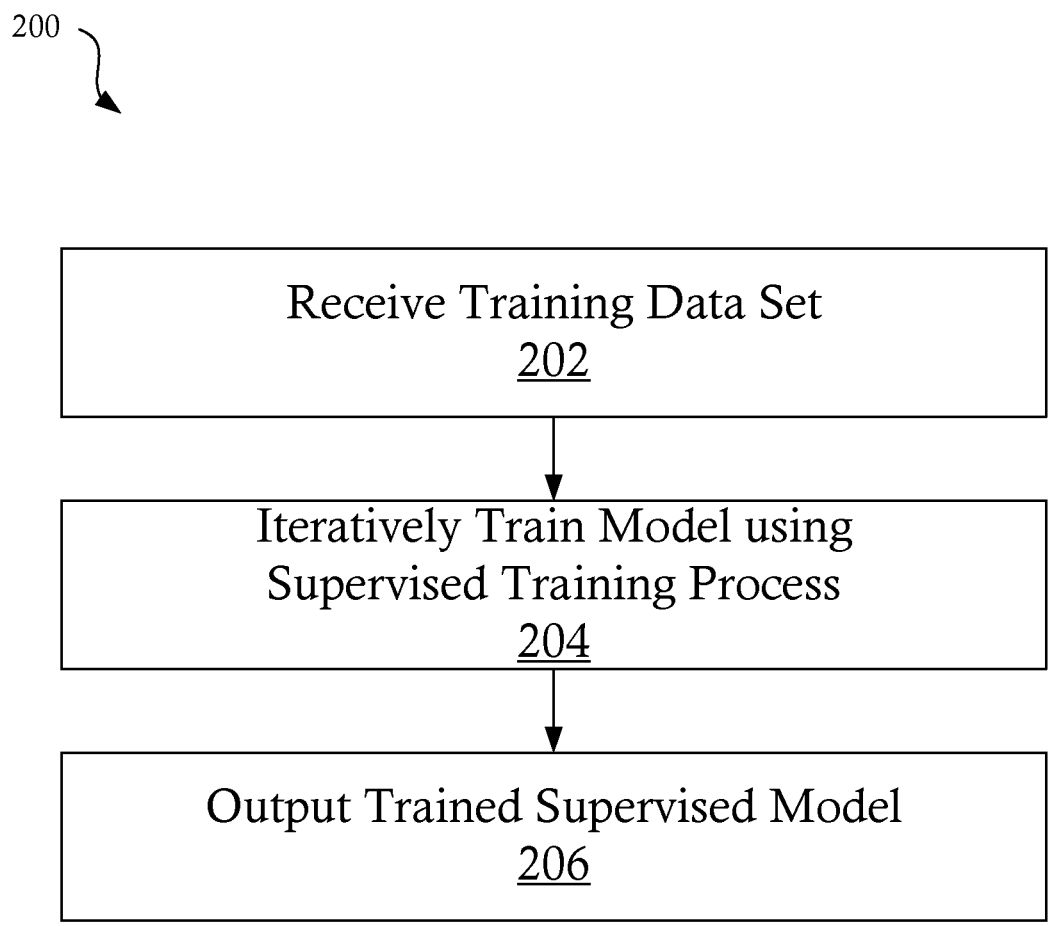
FIG. 5 is a flowchart illustrating a method of training a supervised learning model to provide a set of recommendations based on product features, in accordance with some embodiments.
Figure 6:
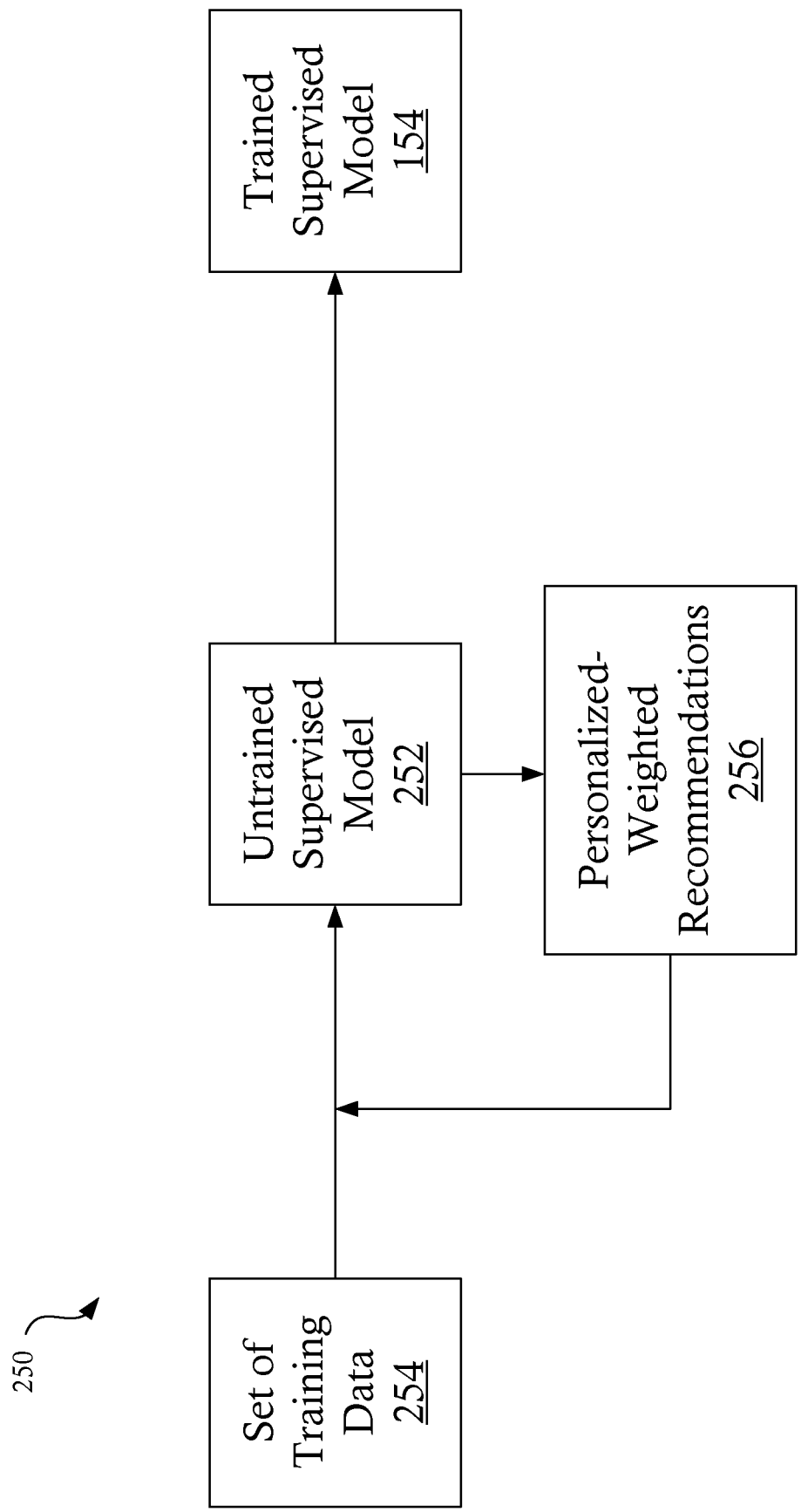
FIG. 6 is a process flow illustrating various steps of the method of training a supervised learning model illustrated in FIG. 5, in accordance with some embodiments.

FIG. 5 is a flowchart 200 illustrating a method of training a supervised learning model to provide a set of recommendations based on product features, in accordance with some embodiments. FIG. 6 is a process flow 250 illustrating various steps of the method of training a supervised learning model illustrated in FIG. 5, in accordance with some embodiments. At step 202, a set of training data 254 is received. The set of training data 254 includes a set of labeled data configured to train the model 252 according to one or more supervised training processes. For example, in some embodiments, the set of training data 254 includes add-to-cart data for a set of users over a predetermined time period. The predetermined time period may be any suitable time period, such as, for example, one month, three months, six months, one year, etc. In some embodiments, the data is labeled such that if a user u adds an item j to their cart within a window size of k from adding an item i to their cart, the data is labeled with a 1. Otherwise, the data is labeled with a 0.

At step 204, a supervised learning process is iteratively applied to train a model 252. The model 252 may include an untrained model, a previously trained model, and/or any other suitable supervised model. In some embodiments, the supervised learning process includes a logistic regression. The logistic regression may be applied based on a set of features to identify (or capture) associations between a user, an anchor item (e.g., item i added to a cart), and/or a recommended item (e.g., item j added to cart). As one example, the logistic regression may consider a feature defined as:

$$f_{u,i,j} = \Sigma_u^m 1/r$$

where m is a number of add-to-cart sequences in which a user u adds items i to a cart and adds item j to the cart within the time window k, and r is the position of j when it is added to the cart. As another example, the logistic regression may consider the recency of a recommended item bought by the user (e.g., not recommending/considering items that were bought in recent transactions). This feature may be applied to capture purchase intervals of recommended items for a user. Although specific embodiments are discussed herein, it will be appreciated that the logistic regression may be applied to any number of features to train the model 252 and/or identify user preferred items.

In some embodiments, the model 252 is configured to rank a set of recommended items identified by the model based on the probability of each of the recommended items. For example, in some embodiments, the logistic regression generates a set of available items $\{j_{p1}, \ldots, j_{pN}\}$ which are subsequently ranked by probability to generate a set of personal item recommendations $\{j_{(p1)}, \ldots, j_{(pN)}\}$ for each set of user (u) and anchor item (i). Although specific embodiments are discussed herein, it will be appreciated that any suitable supervised learning process can be applied to train a supervised model 154 configured to generate a set of personalized-weighted items 160. In some embodiments, each iteration of the training process generates a set of personalized-weighted recommendations 256 that are used as an input to the next iterative training cycle.

At step 206, a trained supervised model 154 is output. The trained supervised model 154 is configured to generate a set of personalized-weighted items 160 based on a received set of user data, such as, for example, a user u and an anchor item i.

Figure 7:
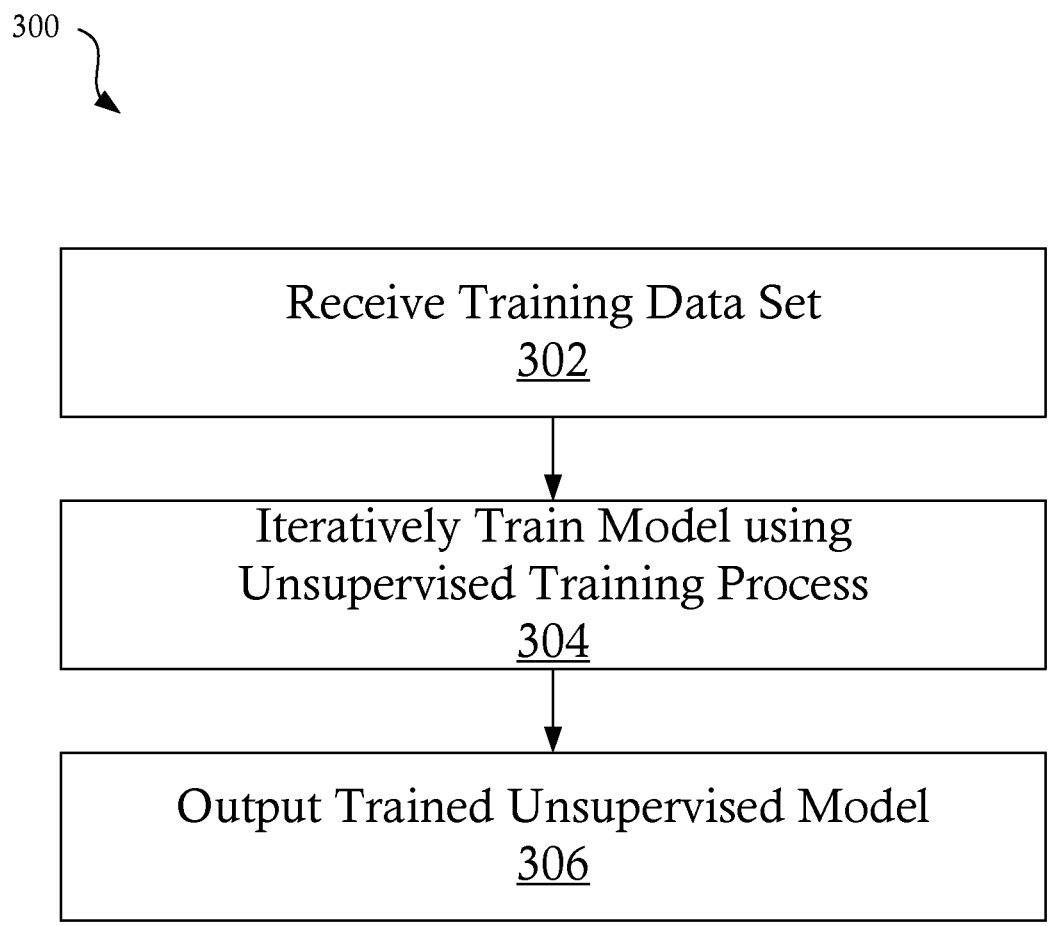
FIG. 7 is a flowchart illustrating a method of training an unsupervised learning model to provide a set of recommendations based on add-to-cart data, in accordance with some embodiments.

FIG. 7 is a flowchart 300 illustrating a method of training an unsupervised learning model to provide a set of recommendations based on add-to-cart data, in accordance with some embodiments. FIG. 8 is a process flow 350 illustrating various steps of the method of training an unsupervised learning model illustrated in FIG. 7, in accordance with some embodiments. At step 302, a set of training data 354 is received. The set of training data 354 may include a set triplet data and/or labeled data configured to train the untrained unsupervised model 352 according to one or more unsupervised training processes. For example, in some embodiments, a triple including three objects, a user u, an anchored item i, and a recommendation item j, are used to generate complementary-weighted item recommendations.

At step 304, an unsupervised learning process is iteratively applied to train a model 352. For example, in some embodiments, a Triple2Vec process may be applied which embeds each of the objects into three vector spaces, U, $V_a$, and $V_r$, respectively. The interaction between each of the objects is modeled as a distance between the vectors within respective vector spaces. For example, given a user u and an associated transaction, a triple of $\langle u,i,j \rangle$ is extracted from the transaction, where i is the anchor item and j as an item purchased in the same transaction.

In some embodiments, the distance measure between two vectors may be generated by minimizing a loss function between two of the vectors in the triple. The loss function may be intuitive, i.e., a reduction of loss also results in a reduction of distance between the vectors. The loss function may be optimized by one or more known optimization techniques such as, for example, a stochastic gradient descent method. In some embodiments, the loss function is represented as:

$$\mathcal{L} = \langle u,i \rangle + \langle u,j \rangle + \langle i,j \rangle, u \in U, i \in V_a, j \in V_r$$

Although embodiments are discussed herein including a Triple2Vec model, it will be appreciated that the unsupervised learning process can any suitable unsupervised learning process that models an interaction between the triple of $\langle u,i,j \rangle$ may be applied. The use of an unsupervised model allows the combined selection process to overcome a lack of ground truth with respect to complementary items.

In some embodiments, the untrained unsupervised model 352 is configured to rank the set of personalized-weighted recommendations 356 generated during each iteration based on one or more metrics to generate a set of user-ranked complementary-weighted items 166. The ranking process may be based on any suitable metric, such as, for example, a distance between an anchor item i and the recommended item j, the distance between the user u and the item j (i.e., item vector representation), and/or any other suitable metric. Re-ranking of the complementary-weighted items generates a set of user-ranked complementary-weighted items that are configured to reflect a scope of a user, i.e., user preferences with respect to complimentary-weighted items.

In some embodiments, the untrained unsupervised model 352 is configured (e.g., trained) to re-rank the set of complementary-weighted items 356 based on a score of user preferences in ascending order. For example, in one embodiment, the preference scores (s) for a set of complementary-weighted items $\{j_1, \ldots, j_N\}$ with respect a specific user (u) is represented as:

$$s(u,j_{(1)}) \propto s(u,j_{(n)})$$

which generates a set of ranked complementary-weighted items $\{j_{(1)}, \ldots, j_{(N)}\}$.

At step 306, a trained unsupervised model 154 is output. The trained unsupervised model 154 is configured to generate a set of complementary items 160 based on a received set of user data, such as, for example, a user u and an anchor item i.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a non-transitory memory having instructions stored thereon and a processor configured to read the instructions to:
generate, by an iterative training process using a first training data set including add-to-cart data, a trained supervised model;
generate, by an iterative training process using a second training data set including a triple including a user, an anchor item, and a recommendation item, a trained unsupervised model, wherein the trained unsupervised model is configured to minimize a loss function between at least two vectors in a triple of $\langle u,i,j \rangle$, where u is a vector representation of a user, i is a vector representation of an anchor item, and j is a vector representation of an item co-purchased with the anchor item;
receive a user identifier and an anchor item identifier;
generate, by the trained supervised model, a set of personalized-weighted items based on the user identifier and the anchor item identifier;
generate, by the trained unsupervised model, a set of complementary-weighted items based on the user identifier; and
generate a set of personalized complementary recommendations including a subset of the personalized-weighted items and a subset of the complementary-weighted items.

2. The system of claim 1, wherein the trained supervised model applies a logistic regression to a predetermined set of features to generate the set of personalized-weighted items.

3. The system of claim 2, wherein the predetermined set of features includes a feature f where:

$$f_{u,i,j} = \Sigma_u^m 1/r$$

where m is a number of add-to-cart sequences in which a user u adds an item i to a cart and adds an item j to the cart within a time window k, and r is the position of item j when item j is added to the cart.

4. The system of claim 2, wherein the predetermined set of features includes a feature representative of a recency of a recommended item bought by a user.

5. The system of claim 1, wherein the loss function $\mathcal{L}$ is represented as:

$$\mathcal{L} = \langle u,i \rangle + \langle u,j \rangle + \langle i,j \rangle, u \in U, i \in V_a, j \in V_r$$

where U is vector space of the user, $V_a$, is a vector space of the anchor item, and $V_r$ is a vector space of the co-purchased item.

6. The system of claim 1, wherein the processor is configured to read the instructions to generate the set of personalized complementary recommendations to:
generate a set of ranked complimentary-weighted items by ranking the set of complimentary-weighted items according to at least one metric;
generate a set of combined items including at least one of the personalized-weighted items and at least one of the ranked complimentary-weighted items; and
select k top-ranked items from the set of combined items.

7. The system of claim 6, wherein the at least one metric comprises a distance between an anchor item i and a recommended item j.

8. A non-transitory computer readable medium having instructions stored thereon, wherein the instructions, when executed by a processor cause a device to perform operations comprising:
generating, by an iterative training process using a first training data set including add-to-cart data, a trained supervised model;
generating, by an iterative training process using a second training data set including a triple including a user, an anchor item, and a recommendation item, a trained unsupervised model, wherein the trained unsupervised model is configured to minimize a loss function between at least two vectors in a triple of $\langle u,i,j \rangle$, where u is a vector representation of a user, i is a vector representation of an anchor item, and j is a vector representation of an item co-purchased with the anchor item;
receiving a user identifier and an anchor item identifier;
generating, by the trained supervised model, a set of personalized-weighted items based on the user identifier and the anchor item identifier;
generating, by the trained unsupervised model, a set of complementary-weighted items based on the user identifier and the anchor item identifier; and
generating a set of personalized complementary recommendations including a subset of the personalized-weighted items and a subset of the complementary-weighted items.

9. The non-transitory computer readable medium of claim 8, wherein the trained supervised model applies a logistic regression to a predetermined set of features to generate the set of personalized-weighted items.

10. The non-transitory computer readable medium of claim 9, wherein the predetermined set of features includes a feature f where:

$$f_{u,i,j} = \Sigma_u^m 1/r$$

where m is a number of add-to-cart sequences in which a user u adds an item i to a cart and adds an item j to the cart within a time window k, and r is the position of item j when item j is added to the cart.

11. The non-transitory computer readable medium of claim 9, wherein the predetermined set of features includes a feature representative of a recency of a recommended item bought by a user.

12. The non-transitory computer readable medium of claim 8, wherein the loss function $\mathcal{L}$ is represented as:

$$\mathcal{L} = \langle u,i \rangle + \langle u,j \rangle + \langle i,j \rangle, u \in U, i \in V_a, j \in V_r$$

where U is vector space of the user, $V_a$, is a vector space of the anchor item, and $V_r$ is a vector space of the co-purchased item.

13. The non-transitory computer readable medium of claim 8, wherein generating the set of personalized complementary recommendations comprises:
generating a set of ranked complimentary-weighted items by ranking the set of complimentary-weighted items according to at least one metric;
generating a set of combined items including at least one of the personalized-weighted items and at least one of the ranked complementary-weighted items; and
selecting k top-ranked items from the set of combined items.

14. The non-transitory computer readable medium of claim 13, wherein the at least one metric comprises a distance between an anchor item i and a recommended item j.

15. A computer-implemented method, comprising:
generating, by an iterative training process using a first training data set including add-to-cart data, a trained supervised model;
generating, by an iterative training process using a second training data set including a triple including a user, an anchor item, and a recommendation item, a trained unsupervised model, wherein the trained unsupervised model is configured to minimize a loss function between at least two vectors in a triple of $\langle u,i,j \rangle$, where u is a vector representation of a user, i is a vector representation of an anchor item and j is a vector representation of an item co-purchased with the anchor item, and wherein the loss function $\mathcal{L}$ is represented as:

$$\mathcal{L} = \langle u,i \rangle + \langle u,j \rangle + \langle i,j \rangle, u \in U, i \in V_a, j \in V_r$$

where U is vector space of the user, $V_a$ is a vector space of the anchor item, and $V_r$ is a vector space of the co-purchased item; and
receiving a user identifier and an anchor item identifier;
generating a set of personalized-weighted items, by the trained supervised model, based on the user identifier and the anchor item identifier;
generating a set of complementary-weighted items, by the trained unsupervised model, based on the user identifier and the anchor item identifier; and
generating a set of personalized complementary recommendations including a subset of the personalized-weighted items and a subset of the complementary-weighted items.

16. The computer-implemented method of claim 15, wherein the trained supervised model applies a logistic regression to a predetermined set of features to generate the set of personalized-weighted items, wherein the predetermined set of features includes a feature f where:

$$f_{u,i,j} = \Sigma_u^m 1/r$$

where m is a number of add-to-cart sequences in which a user u adds an item i to a cart and adds an item j to the cart within a time window k, and r is the position of item j when item j is added to the cart, and wherein the predetermined set of features includes a feature representative of a recency of a recommended item bought by a user.

17. The computer-implemented method of claim 15, wherein generating the set of personalized complementary recommendations comprises:
- generating a set of ranked complimentary-weighted items by ranking the set of complimentary-weighted items according a distance between an anchor item i and a recommended item j and a distance between a user u and the recommended item j;
- generating a set of combined items including at least one of the personalized-weighted items and at least one of the ranked complementary-weighted items; and
- selecting k top-ranked items from the set of combined items.

* * * * *